United States Patent

[11] 3,597,986

[72] Inventor Pierre Bouthors
Philippe Quemerais, both of Billancourt, France
[21] Appl. No. 20,513
[22] Filed Mar. 18, 1970
[45] Patented Aug. 10, 1971
[73] Assignee Regie Nationale Usines Renault
Billancourt (Hauts de Seine) France and Automobiles Peugeot, Paris, France
[32] Priority Mar. 24, 1969
[33] France
[31] 6908575

[54] FRICTION-RING VARIABLE-SPEED TRANSMISSION MECHANISMS
2 Claims, 4 Drawing Figs.
[52] U.S. Cl. .................................................. 74/230.17 F,
74/203, 74/217 CV, 74/230.17 A
[51] Int. Cl. ........................................................ F16h 55/52,
F16h 15/00, F16h 9/00
[50] Field of Search .......................................... 74/217 CV,
217 R, 230.17 A, 230.17 F, 203

[56] References Cited
UNITED STATES PATENTS
803,811 11/1905 Cutter ............................. 74/217 CV
1,966,831 7/1934 Oakes et al. .................. 74/217 CV
FOREIGN PATENTS
156,527 10/1932 Switzerland.................. 74/217 CV Primary Examiner—Leonard H. Gerin
Attorney—Stevens, Davis, Miller and Mosher ABSTRACT: Friction-ring variable-speed transmission mechanism comprising parallel input shaft and output shafts, the input shaft carrying a pair of frustoconical plates having interposed therebetween a ring member adapted to coact with said plate through corresponding friction surfaces, one plate being adapted to move axially under adequate control means, this variable-speed transmission mechanism being characterized in that said rings are formed with external teeth, and that said teeth are drivingly connected through a meshing flexible member to corresponding teeth formed on a twin pinion mounted for free rotation on a support movable about the output shaft, the other set of teeth of this twin pinion meshing with those of a pinion rotatably solid with said output shaft, the change in the transmission ratio being obtained by causing a controlled angular displacement of said movable support.

Patented Aug. 10, 1971

FRICTION-RING VARIABLE-SPEED TRANSMISSION MECHANISMS

The present invention relates to friction-ring variable-speed transmission mechanism and has specific reference to a transmission mechanism of this character which is capable of giving a relatively wide range of transmission ratios from the direct or straight-through drive by using a single stage.

Different types of friction-ring variable-speed transmission mechanisms are already known.

In a first known type the ring engages with its conical concave surfaces two pairs of convex frustoconical plates or discs having a variable relative spacing. In this type of variable speed transmission mechanism the ring is movable radially from a position corresponding to an input-to-output speed ratio of 1:1 wherein the maximum efficiency is obtained. This variable-speed transmission permits of obtaining output speeds lower or higher than the input speed however with a lower efficiency.

According to another known type, the variable-speed transmission mechanism comprises a plurality of pairs of convex frustoconical plates or discs, these pairs being interconnected through a driving ring. This ring is provided on the one hand with inner friction surfaces engaging the driving plates and on the other hand outer friction surfaces engaging driven plates.

One drawback characterizing these known arrangements is the impossibility of obtaining a direct or straight-through drive for the parallel input and output shafts are constantly coupled through said friction-ring.

Under these conditions, it is clear that the efficiency of these variable-speed transmission mechanisms is relatively low, irrespective of the transmission ratio.

It may also be noted that the power transmittable through these variable-speed mechanisms can only be relatively low, for the cooling of the assembly constitutes a delicate problem.

It is the essential object of the present invention to avoid the inconveniences set forth hereinabove by providing a friction ring variable-speed transmission mechanism comprising parallel input and output shafts, the input shaft carrying a pair of frustoconical plates or discs having interposed therebetween a ring member coacting with said plates through corresponding friction surfaces, one plate being adapted to move axially under adequate control means, this variable-speed transmission mechanism being characterized in that said ring is formed with external teeth, and that said teeth are drivingly connected through a meshing flexible member to corresponding teeth formed on a twin pinion mounted for free rotation on a support movable about the output shaft, the other set of teeth of this twin pinion meshing with those of a pinion rotatably solid with said output shaft, the change in the transmission ratio being obtained by causing a controlled angular displacement of said movable support.

Other features of this invention will appear as the following description proceeds with reference to the attached drawing illustrating diagrammatically by way of example a typical form of embodiment thereof. In the drawing.

Figure 1:
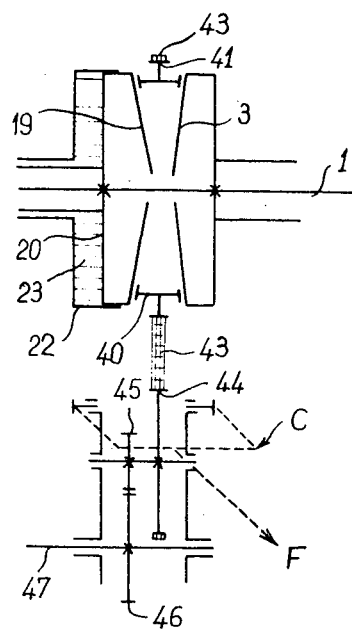
FIG. 1 is a diagram illustrating the relative arrangement or disposal of the component elements of the variable-speed transmission mechanism of this invention.

The variable-speed transmission illustrated in the drawing comprises a driving or power shaft 1 rotatably coupled through splines 2 to a tubular hub 4 concentric to shaft 1 and provided with a pair of journals 5 and 6 for rolling-contact bearings 7, 8 having their outer races 9, 10 retained in a sleeve 11 closed at its outer end by a cover 12 secured by means of screws 13 to a fixed carrier member 14. A series of stacked resilient rigid with diaphragms 15 is rotatably rigid with a disc 16 by engaging notches 16a formed in this disc, the latter being secured to a flange 17 of a hub 18 mounted through splines on shaft 1 so as to be rotatably rigid therewith and held against axial movement in relation thereto by a circlip 18a, said resilient diaphragms bearing likewise against a movable plate 19 formed with a frustoconical surface and secured by screws to a piston 20. This piston 20, adapted to be exposed to a controllable fluid pressure for a purpose to be explained presently, is slidably mounted in a drum 22 so as to form a chamber 23 therewith. This drum has a hub extension 24 concentric to the piston rod and this extension 24 comprises journals 25, 26 engaged by rolling-contact bearings 27 and 28 respectively, the outer races 29 and 30 of these bearings being retained in a cylindrical member 31 closed at its outer end by a cover 32 and secured by screws 33 to a fixed support 34. The chamber 23 is adapted to be supplied via a passage 35 formed in the hub extension 24 and a pipe connecting member 36 thereof secured to said cover 32.

A ring 40 formed with external teeth 41 carries a pair of opposed lateral annular friction inserts 42 of which the friction surfaces have the same apex angle as the registering frustoconical surfaces of plates 3 and 19 which they are adapted to engage, these friction inserts 42 being friction fitted in corresponding annular seats formed concentrically in said ring 40.

A flexible coupling member such as an endless chain or, as shown in the drawing, a cogged rubber belt 43, in meshing engagement with the teeth 41 of ring 40, is provided for driving a twin pinion comprising a first set of teeth 44 meshing with the same belt 43 and another set of teeth 45 meshing with a pinion 46 rotatably solid with the output shaft 47 of the variable-speed transmission mechanism.

This twin pinion 44, 45 is mounted on a shaft 48 with the interposition of a needle bearing 49. This shaft 48 is carried by a pair of parallel arms 50 rotatably mounted through rolling-contact bearings on another shaft 47 and responsive to control means C shown only in diagrammatical form in FIGS. 1, 2 and 3 and comprising for instance a hydraulic cylinder and piston unit (not shown) adapted to adjust the angular position of said parallel arms 50 and therefore the position of ring 40 between the frustoconical clamping plates 3 and 19, so as to cause the transmission ratio of the mechanism to vary accordingly. This transmission ratio changes with the eccentric position of ring 40 in relation to the shaft 1, and it will be noted that due the frictional engagement with the frustoconical plates 3 and 19 the ring 40 tends to become centered therein during the operation of the mechanism, and that the action of control means C takes place in opposition to this tendency, in the direction F shown in FIGS. 1, 2 and 3.

Figure 4:
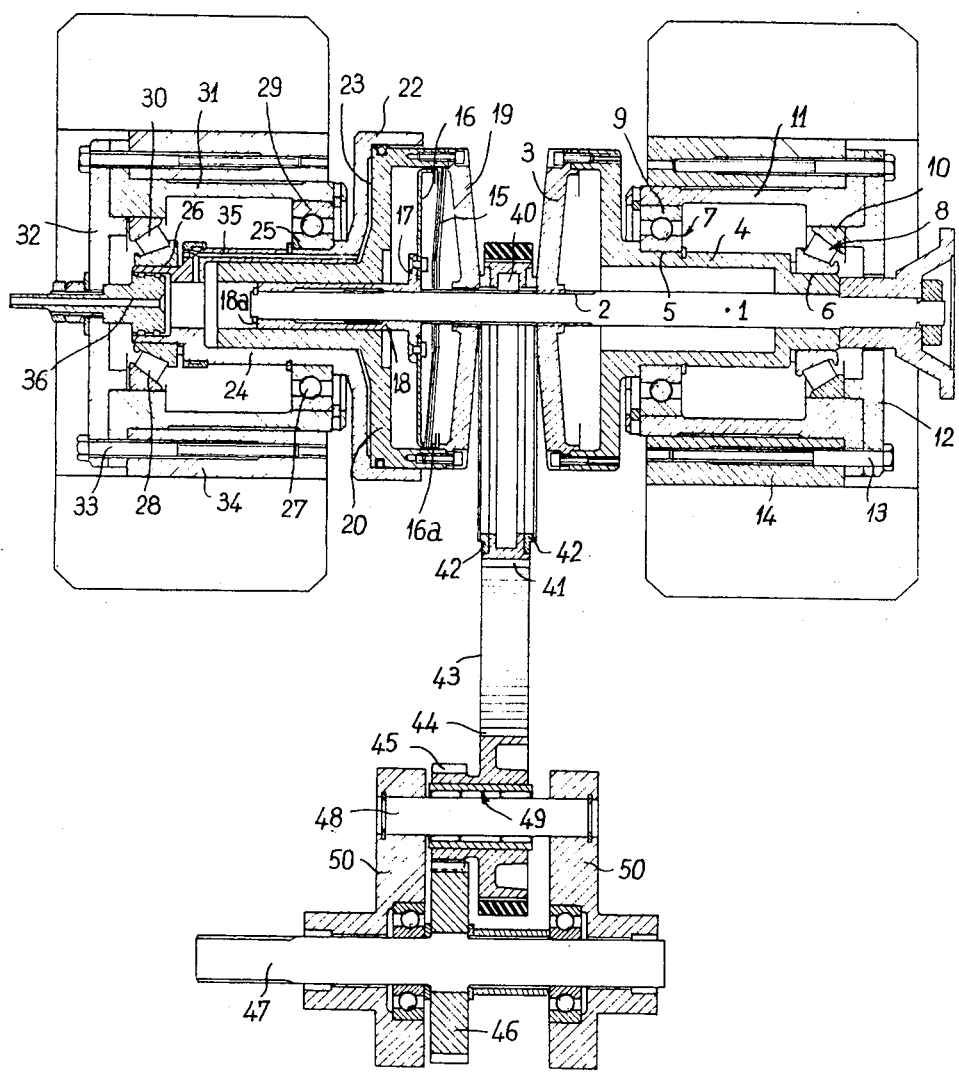
FIG. 4 is a detailed section showing a practical form of embodiment of the variable-speed mechanism, the section being taken along a plane containing the axes of the various shafts of the mechanism.

As illustrated in FIG. 4, when no fluid pressure is present in chamber 23, the diaphragms 15 urge the movable plate 19 against the relevant friction insert 42 of ring 40 but without driving the latter.

The vehicle equipped with this transmission mechanism may be started from rest by gradually increasing the pressure of the fluid introduced into said chamber 23, so as to cause the friction inserts 42 of ring 40 to be clamped between the frustoconical plates 3 and 19 according to the force of the fluid pressure, the frictional contact between the inserts 42 and the ring 40 assisting in providing the desired transmission progressiveness.

The kinematic chain of this variable-speed mechanism comprises in succession the members 1, 3, 19, 40, 41, 43, 44, 45, 46 and 47.

Figure 3:
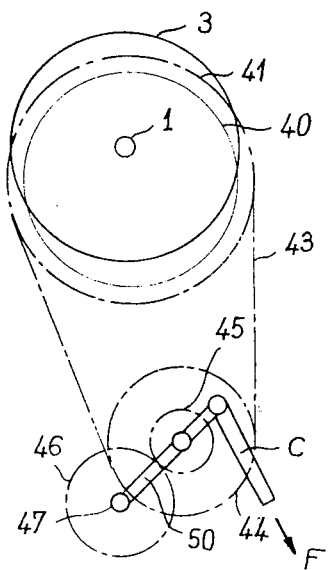
FIG. 3 is a view similar to FIG. 2 showing the mechanism in the direct-drive position.
Figure 2:
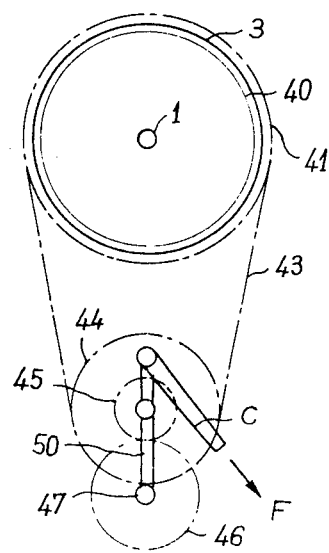
FIG. 2 is a side elevational view showing also diagrammatically the mechanism in the position giving an intermediate transmission ratio.

As illustrated in FIGS. 2 and 3, a continuous variation in the transmission ratio is obtained by causing an angular movement of the parallel arms 50 normally urged to their inoperative position by the control means C in the direction of the arrow F, i.e. in the position of maximum eccentricity of ring 40 in relation to plates 3 and 19, so that the vehicle can be started in the position giving the lowest gear, i.e. the biggest reduction between engine and driving wheels, the direct-drive position being shown in FIG. 2.

Without further analysis, the foregoing will so fully reveal the gist of the present invention that others can by applying current knowledge readily adapt it for the various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. Friction-ring variable-speed transmission mechanism comprising parallel input shaft and output shafts, the input shaft carrying a pair of frustoconical plates having interposed therebetween a ring member adapted to coact with said plates through corresponding friction surfaces, one plate being adapted to move axially under adequate control means, this variable-speed transmission mechanism being characterized in that said rings is formed with external teeth, and that said teeth are drivingly connected through a meshing flexible member to corresponding teeth formed on a twin pinion mounted for free rotation on a support movable about the output shaft, the other set of teeth of this twin pinion meshing with those of a pinion rotatably solid with said output shaft, the change in the transmission ratio being obtained by causing a controlled angular displacement of said movable support.

2. Friction-ring variable-speed transmission mechanism according to claim 1, characterized in that the friction surfaces of said ring consist of a pair of annular lateral friction inserts mounted with a friction fit in said ring.